(12) United States Patent
Hussain

(10) Patent No.: US 6,252,610 B1
(45) Date of Patent: Jun. 26, 2001

(54) METHOD AND APPARATUS FOR EFFICIENTLY SWITCHING STATE IN A GRAPHICS PIPELINE

(75) Inventor: Zahid S. Hussain, San Carlos, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/087,423

(22) Filed: May 29, 1998

(51) Int. Cl.[7] ....................................... G06T 1/20
(52) U.S. Cl. ............................ 345/506; 345/507
(58) Field of Search ................... 345/506, 505, 345/507–509, 501, 522

(56) References Cited

U.S. PATENT DOCUMENTS

| | | | |
|---|---|---|---|
| 5,914,726 | * 6/1999 | Schultz | 345/501 |
| 5,917,502 | * 6/1999 | Kirkland et al. | 345/505 |
| 5,977,977 | * 11/1999 | Kajiya et al. | 345/418 |
| 6,025,853 | * 2/2000 | Baldwin | 345/506 |

* cited by examiner

*Primary Examiner*—Kee M. Tung
(74) *Attorney, Agent, or Firm*—Squire, Sander & Dempsey L.L.P

(57) ABSTRACT

A method and apparatus for multipass rendering of graphics primitives is provided. The apparatus of the present invention includes a graphics pipeline organized as a sequence of tasks. A set of state information blocks are provided for each pipeline tasks. A host processors stores a set of graphics attributes for each task in the state information blocks. The host processor then sends a first token through the graphics pipeline. The first token causes each task to select the state information block that is associated with that task and the first rendering pass. The host processor then sends a group of graphics primitives through the graphics pipeline. Each tasks performs a graphics transformation on the graphics primitives using the graphics attributes stored in the state information block selected for that task. The host processor then sends a second token through the graphics pipeline. The second token causes each task to select the state information block that is associated with that task and the second rendering pass. The host processor then sends the same group of graphics primitives through the graphics pipeline. The process of using tokens to select state information blocks, followed by rendering graphics primitives is repeated until the multipass rendering process is complete.

19 Claims, 3 Drawing Sheets

METHOD AND APPARATUS FOR EFFICIENTLY SWITCHING STATE IN A GRAPHICS PIPELINE

FIELD OF THE INVENTION

The present invention relates generally to systems for computer graphics. More specifically, the present invention includes a method and apparatus for efficient multipass rendering of graphics primitives.

BACKGROUND OF THE INVENTION

Computer systems (and related devices) typically model three-dimensional images using a mosaic-like approach where each image is partitioned into a collection of individual points, lines and polygons. These points, lines and polygons are know as primitives and a single image may require thousands, or even millions, of primitives. The definition of an image may also include one or more graphics attributes. Each attribute defines a property that affects how the primitives within an image will appear. Examples of attributes include attributes that define light sources and attributes that define textures.

The primitives and attributes used to describe three-dimensional images are transformed into pixel values using a process known as rendering. The rendering process is typically partitioned into a series of tasks that are arranged as a sequential pipeline. Early tasks within this pipeline perform transformations on the primitives included within the image being rendered. For example, a task may be used to transform primitives to reflect the presence of a light source. The operation of these tasks is controlled by the attributes included within the image definition. Thus, operation of a lighting task is controlled by attributes that describe light sources.

The transformation tasks are followed by one or more rasterization tasks. The rasterization tasks transform each primitive into a collection of pixel values. The pixel values are stored in a memory storage device known as a frame buffer. Rasterization tasks, like transformation tasks, operate under control of the attributes included within the image definition. As an example, operation of a texturing task is controlled by attributes that describe image textures. In some ways, rasterization tasks resemble transformation tasks. Unlike transformation tasks, however, the effect of rasterization tasks is pixel oriented. This distinguishes these tasks from transformation tasks because the latter generally operate to transform primitives, not pixels.

Multipass rendering is a technique that builds upon the basic rendering mechanism just described. For multipass rendering, the same pipeline is used to repeatedly render selected primitives within an image. Each iteration of this process is referred to as a pass. During each pass, the pipeline performing the rendering process is reconfigured to reflect a different set of attributes. This alters the rendering effect produced by each successive pass. As an example, successive passes may specify different light sources or different textures. In this way, multipass rendering allows more complex sequences of tasks to be used during image creation. The net effect is to increase image quality and complexity. This makes multipass rendering especially important when photo-realistic three-dimensional images are required.

Unfortunately, creating images using multipass rendering tends to be relatively time consuming. One method for expediting multipass rendering is to divide the primitives within an image into small groups. These groups are then processed on a group-by-group basis. Rendering of preceding groups is completed through each pass before rendering of following groups initiates. Ordering multipass rendering on a primitive-by-primitive basis increases the locality of memory accesses within the frame buffer and within the host computer. This increases frame buffer efficiency by reducing DRAM page misses. Increased locality also increases the effectiveness of host and frame buffer cache memories.

Unfortunately, ordering multipass rendering on a group-by-group basis increases the frequency of pipeline reconfiguration. This follows because the pipeline must be repeatedly reconfigured to reflect the entire sequence of passes each time a new group is rendered. The process of pipeline reconfiguration may be time consuming—especially in the case of deep pipelines, involving multiple tasks. In practice, the time spent performing pipeline reconfiguration may partially, or fully, offset the efficiency gained by rendering on a group-by-group basis. As a result, there is a need for rendering methods that exploit the memory locality associated with rendering on a group-by-group basis without the inefficiency associated with repeated pipeline reconfigurations.

SUMMARY OF THE INVENTION

An embodiment of the present invention includes a system for efficient multipass rendering of graphics primitives. The multipass rendering system includes a graphics pipeline organized as a sequential series of tasks followed by a frame buffer. The graphics pipeline receives graphics primitives from a host computer system. Each task within the graphic pipeline performs a specific type of transformation or rasterization operation on the graphics primitives. The entire sequence of tasks combines to render the received primitives into pixel values stored in the frame buffer.

The rendering apparatus includes a memory system for storing state information. The memory system is organized so that each pipeline task has an associated series of state information blocks. These state information blocks are organized on a rendering pass by rendering pass basis. This provides each rendering task with a first state information block for a first rendering pass, a second state information block for a second rending pass, and so on.

Prior to multipass rendering, the host computer stores graphics attributes, corresponding to a series of rendering passes, in the memory system. The host computer then passes a first token through the graphics pipeline. The first token causes the pipeline tasks to select their respective first state information blocks. The host computer follows the first token by sending a selected group of one or more graphics primitives through the graphics pipeline. The graphics primitives are rendering by the pipeline tasks, using the state information included in the first state information blocks.

The host processor then sends a second token through the graphics pipeline. The second token causes the pipeline tasks to select their respective second state information blocks. The host computer follows the second token by sending the same group of graphics primitives through the graphics pipeline. This causes the graphics primitives to be rendering by the pipeline tasks using the state information included in the second state information blocks.

The process of passing tokens to select state information blocks followed by rendering the selected group of graphics primitives is repeated until the selected primitives have been fully rendered. The entire process is then repeated to render other groups of graphics primitives. In this way, the present invention provides a multipass rendering system that largely avoids the expense of pipeline reconfiguration between rendering passes. At the same time, the present invention provides a system that allows graphics primitives to be rendering on a group-by-group or even primitive-by-primitive basis. This increases the locality of frame buffer memory accesses and increases the performance of the rendering system.

Advantages of the invention will be set forth, in part, in the description that follows and, in part, will be understood by those skilled in the art from the description herein. The advantages of the invention will be realized and attained by means of the elements and combinations particularly pointed out in the appended claims and equivalents.

BRIEF DESCRIPTION OF THE DRAWINGS

The accompanying drawings, that are incorporated in and constitute a part of this specification, illustrate several embodiments of the invention and, together with the description, serve to explain the principles of the invention.

DETAILED DESCRIPTION OF THE PREFERRED EMBODIMENTS

Reference will now be made in detail to preferred embodiments of the invention, examples of which are illustrated in the accompanying drawings. Wherever convenient, the same reference numbers will be used throughout the drawings to refer to the same or like parts.

Environment

Figure 1:
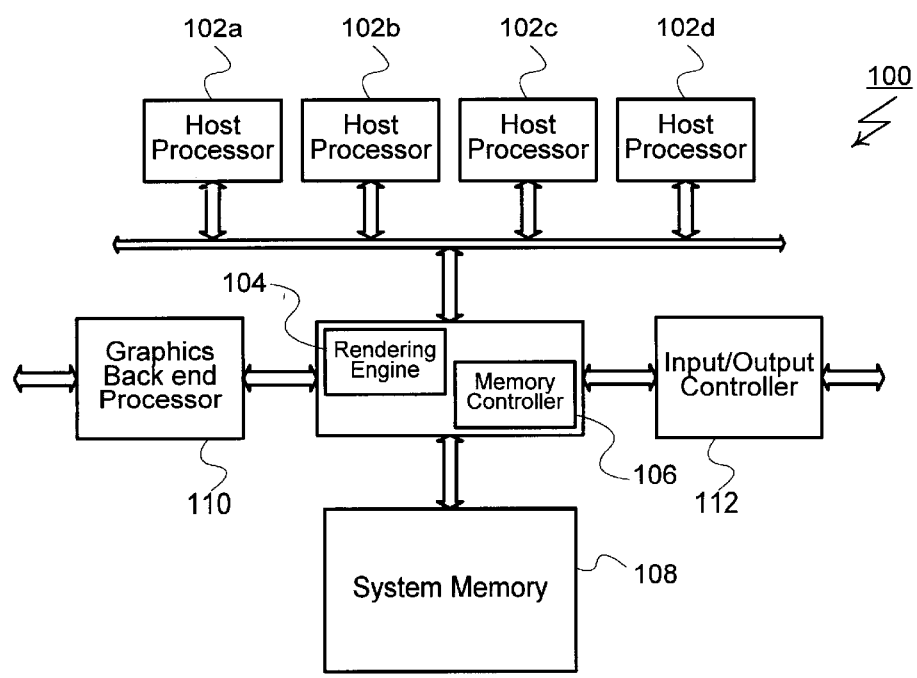
FIG. 1 is a block diagram of a host computer system shown as an exemplary environment for an embodiment of the present invention.

In FIG. 1, a host computer system 100 is shown as a representative environment for the present invention. Structurally, host computer system 100 includes a host processor, or host processors, of which host processors 102a through 102d are representative. Host processors 102 represent a wide range of commercially available or proprietary types. Host computer system 100 may include either more or fewer host processors 102 than the number shown in FIG. 1.

Host computer system 100 also includes a rendering engine 104, a system memory 108 and a memory controller 106. Memory controller 106 provides simultaneous access to system memory 108 to host processors 102 and rendering engine 104. For the exemplary implementation of FIG. 1, memory controller 106 and rendering engine 104 are shown as sub-components of a combined memory controller/rendering engine subsystem. This grouping allows memory controller 106 and rendering engine 104 to be implemented as a single integrated circuit. This combined implementation is entirely representative in nature. These components may be implemented separately or combined with more components without departing in any way from the present invention.

Host computer system 100 also includes a graphics back end processor 110 and an input/output controller 112. Graphics back end processor 110 cooperates with rendering engine 104 to provide a graphics processor for host computer system 100. Input/output controller 112 functions as a channel allowing host computer system 100 to be connected to a wide range of input/output devices, such as disk drives, non-volatile storage systems, keyboards, modems, network adapters, and printers.

Host computer system 100 is shown as a representative environment for the present invention. Additional details of this representative environment are discussed in co-pending, commonly owned U.S. application Ser. No. 08/713,779, filed Sep. 15, 1996, entitled "A Unified Memory Computer Architecture With Dynamic Graphics Memory Allocation" of Michael J. K. Nielsen and Zahid S. Hussain. It should be appreciated, however, that the present invention is equally applicable to a range of computer systems and related devices and is not limited to the representative environment of host computer system 100.

Graphics Pipeline

Figure 2:
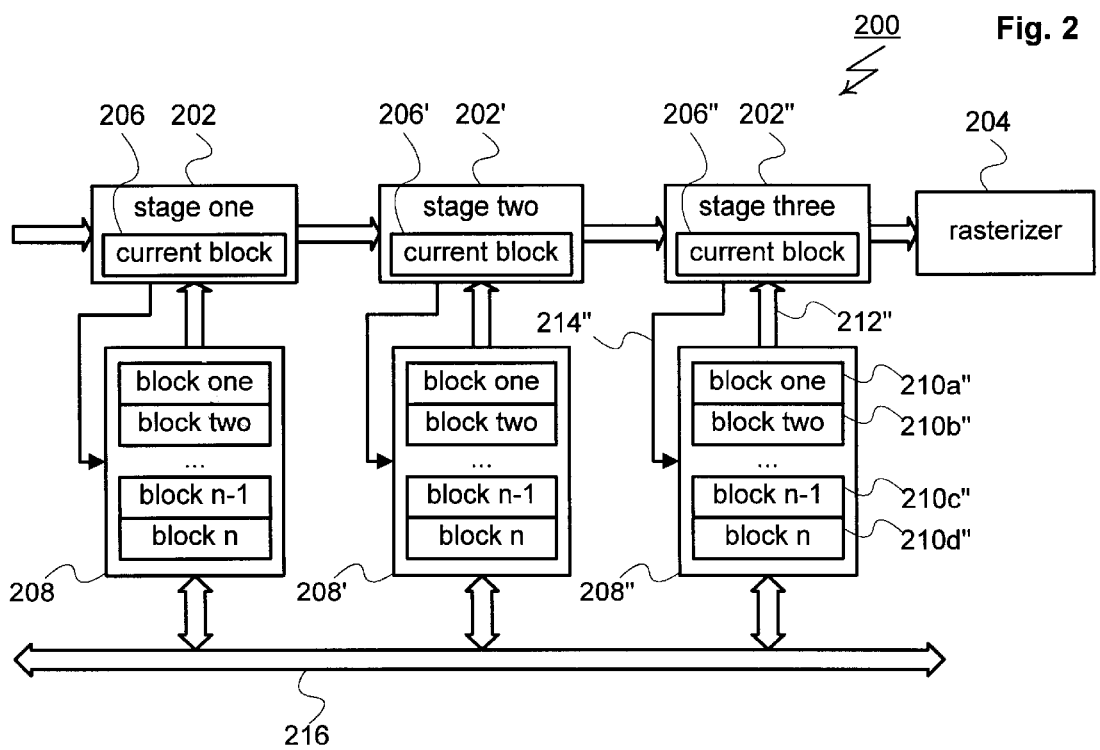
FIG. 2 is a block diagram of a graphics pipeline in accordance with an embodiment of the present invention.

Rendering engine 104 and graphics back end processor 110 are configured to form a graphics pipeline. A representative pipeline of this type is shown in FIG. 2 and generally designated 200. Graphics pipeline 200 includes a series of tasks, of which tasks 202, 202' and 202" are representative. Graphics pipeline 200 may be formed to include any number of tasks 202 without departing from the present invention.

Tasks 202 are arranged as a sequence. The output of each task 202 (except the last task 202") functions as the input for a subsequent tasks 202. The output of task 202" functions as the input for a rasterizer 204. Host processors 102 send graphics primitives to graphics pipeline 200. The graphics primitives form the input to task 202. Tasks 202 applies a graphics transformation, such as a lighting transformation, to each graphics primitive. The transformed primitives are passed to task 202'. Task 202' performs a second type of graphics transformation, such as texturing, to each of the transformed graphics primitives. The now twice transformed graphics primitives are passed to task 202". Task 202" applies a third type of transformation to each graphics primitive and passes the primitives (now transformed three times) to rasterizer 204.

Rasterizer 204 converts the graphics primitives into pixel values and stores the pixel values in a frame buffer. The frame buffer used by rasterizer 204 is a memory that includes a series of randomly accessible memory locations. Each memory location in frame buffer defines a corresponding pixel included in an output device where images generated by graphics pipeline 200 will ultimately be displayed.

Each task 202 in graphics pipeline 200 includes a current state information block of which current state information blocks 206, 206' and 206" are representative. Current state information blocks 206 are memory storage areas. The size of each current state information blocks 206 is configured to contain a graphics attribute appropriate for the pipeline task that includes the memory storage area 206. To continue the previous example, this means that current state information blocks 206 is configured to contain a graphics attribute that describes a lighting transformation. Current state information blocks 206' is configured to contain a graphics attribute that describes a texturing transformation. Current state information blocks 206" is configured to contain a graphics attribute that describes a third type of transformation.

Each task 202 in graphics pipeline 200 has an associated memory storage area 208. Each memory storage area 208 is configured to include a series of state information blocks of which state information blocks 210, 210' and 210" are representative. This means that each tasks 202 has an associated set of state information blocks 210. The number of state information blocks 210 included in each memory storage area 208 is implementation dependent. For some implementations as few as two state information blocks 210 per pipeline task 202 will be sufficient. For more advanced implementations, large numbers of state information blocks 210 will be used.

In general, it should be appreciated that the described architecture of separate memory storage areas 208 for separate tasks 202 is intended to be descriptive in nature. Numerous other memory architectures may be used to provide state information blocks 210 for pipeline tasks 202. In particular, it may be beneficial to include separate memory storage areas 208 as logical divisions of a single memory device.

Each memory storage area 208 is connected to its associated task 202 and associated current state information block 206 using two connections. The first of these connections is a control bus 212. The second is an output bus 214. Each task 202 uses its associated control bus 212 to select a particular state information block 210 within the memory storage area 208 associated with the task 202. Once selected, tasks 202 use output busses 214 to transfer the contents of selected state information blocks 210 to current state information blocks 206. In cases where different memory architectures are used for memory storage area 208, different connections between tasks 202 may be required to allow tasks 202 to select and access state information blocks 210.

Each memory storage area 208 is also connected to an input bus 216. Input bus 216 includes control and data signals that allow host processors 102 to select and initialize state information blocks 210. In some cases, it may be desirable to select and initialize state information blocks 210 using the same data path used to send graphics primitives through graphics pipeline 200. In these cases, the need for a separate input bus 216 is eliminated.

Host processors 102 use input bus 216 to initialize state information blocks 210. Each state information block 210 is initialized to contain the graphics attributes used by a particular task 202 during a particular pass of a multistage rendering process. For example, in the case where a three pass rendering process is to be performed, three state information blocks 210 will be initialized for each task 202. The first state information block 210 for each task 202 (i.e., state information blocks 210a, 210a' and 210a") will be initialized to include graphics attributes used during the first pass of the three stage rendering process. The second state information block 210 for each task 202 (i.e., state information blocks 210b, 210b' and 210b") will be initialized to include graphics attributes used during the second rendering pass. The third state information block 210 for each task 202 (not specifically shown) will be initialized to include graphics attributes used during the third rending pass.

When fully initialized, each task 202 will have an associated set of graphics attributes stored in state information blocks 210. To continue previous examples, this means that task 202 will have a set of three graphics attributes that describe lighting transformations. The first of these (stored in information block 210a) might describe a first light source. The second and third graphics attributes (stored in information blocks 210b and 210c) would, in this example, describe second and third light sources, respectively.

Host processors 102 select the state information blocks 210 that are used by pipeline tasks 202. For one embodiment of the present invention, host processors 102 perform this selection using a set of predefined tokens. Each token is a series of bits. Some portion of these bits will typically function as an identifier. These bits allow tasks 202 to recognize that a received series of bits is a token. The remaining bits identify within token uniquely identify a particular rendering pass and a set of state information blocks 210. Thus, a first token would identify the state information blocks 210 associated with a first rendering pass (i.e., state information blocks 210a, 210a' and 210a"). A second token would identify the state information blocks 210 associated with a second rendering pass (i.e., state information blocks 210b, 210b' and 210b").

Host processors 102 select and send these tokens using the same data path used to send graphics primitives through graphics pipeline 200. Upon receipt of a token, each task 202 uses the received token to select an appropriate state information block 210. Tasks 202 perform this selection by decoding, if necessary, the received token to create an address within memory storage systems 208. Tasks 202 place this address on control busses 212 to select the appropriate state information block 210. The contents (i.e., the graphics attributes) of the selected state information blocks 210 are then transferred to current state information blocks 206 on output busses 214.

The described apparatus allows respective sequences of graphics attributes to be stored for a series of pipeline tasks 202. The graphics attributes are accessible, under control of host processors 102, on a rendering pass by rendering pass basis. It should be appreciated that there may be tasks 202 within graphics pipeline that are not connected to memory storage area 208. These unconnected tasks 202 may function on a rendering pass independent basis or may be supplied with graphics attributes using a separate mechanism.

Method for Multipass Rendering

Figure 3:
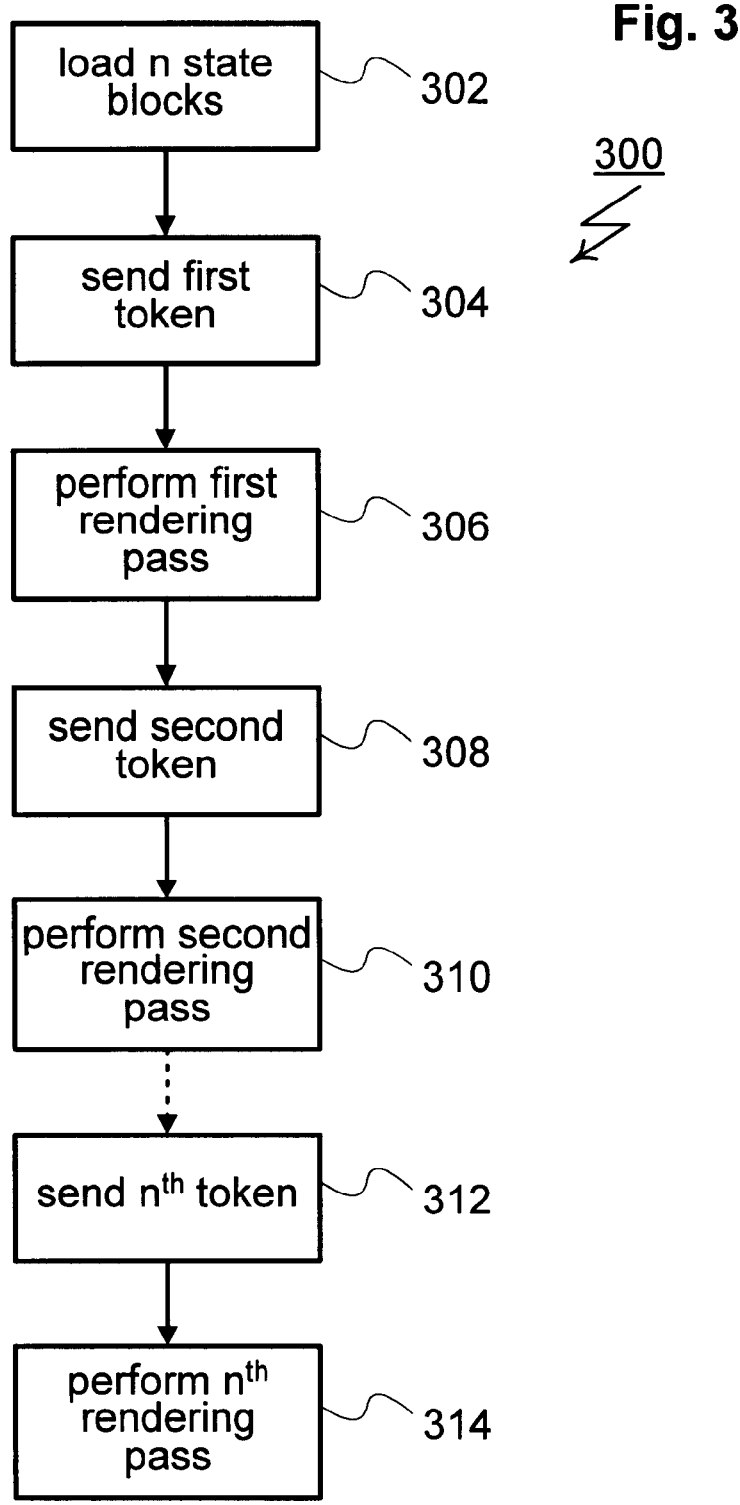
FIG. 3 is a flow chart showing the steps associated with a multipass rendering method as used by an embodiment of the present invention.

A method for multipass rendering, using graphics pipeline 200, is shown in FIG. 3 and generally designated 300. For purposes of generality, method 300 describes an n-pass rendering process. It is assumed that n may be any number greater than zero. In step 302, host processors initiate method 300 by initializing a total of n state information blocks 210 for each task 202. In the case of task 202, the n information blocks 210 will be initialized to include lighting attributes. For task 202', the n information blocks will be initialized to include texture attributes. Other attributes will be loaded for other pipeline tasks 202. For the particular embodiment of graphics pipeline 200 shown in FIG. 2, host processors initialize state information blocks 210 using input bus 216. In other cases, host processors 102 use the same data path used to send graphics primitives through graphics pipeline 200.

In step 304, host processors 102 send a first token through graphics pipeline 200. The first token causes each task 202 to select and load its first state information block 210a into its current state information block 206. As discussed, tasks 202 select state information blocks 210a using control busses 212. Tasks 202 load state information blocks 210a using output busses 214.

In step 306, host processors 102 perform a first rendering pass. This means that host processors 102 send one or more graphics primitives through graphics pipeline. At each task 202, the graphics primitives are transformed using the graphics attributes included in the current state information block 206 included within the task 202.

In step 308, host processors 102 send a second token through graphics pipeline 200. The second token causes each task 202 to select and load its second state information block 210b.

In step 310, host processors 102 perform a second rendering pass. This means that host processors 102 send the same set of graphics primitives (i.e., the set of graphics primitives originally rendering in step 306) through graphics pipeline. At each task 202, the graphics primitives are transformed using the graphics attributes included in the current state information block 206 included within the task 202.

The process of sending tokens followed by performing rendering passes is repeated until an $n^{th}$ token is sent is in 312 and an $n^{th}$ rendering pass is performed in step 314.

Figure 4A:
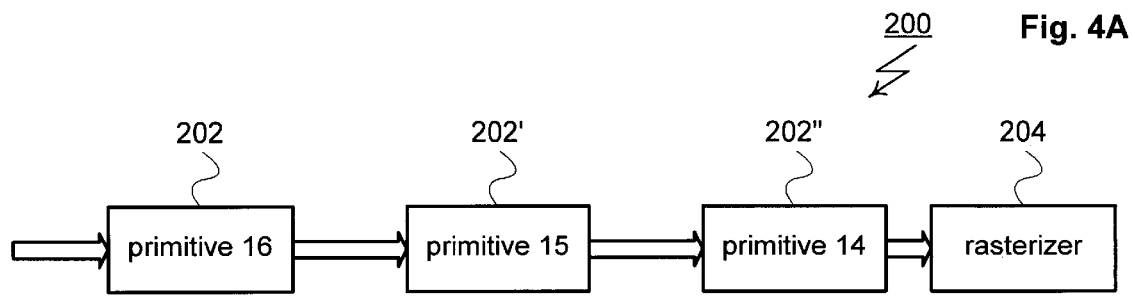
FIG. 4A is a block diagram of a graphics pipeline in accordance with an embodiment of the present invention shown during a first rendering pass.

The use of tokens allows graphics pipeline 200 to overlap operation between adjacent passes in the multipass rendering process. This is shown more clearly by comparison of FIGS. 4A through 4C. In these Figures, graphics pipeline 200 is shown at various time during the multipass rendering of sixteen graphics primitives. In FIG. 4A, graphics pipeline 200 is shown in a first time period as it processes the last three graphics primitives from the group of sixteen. During this time period, the primitive fourteen is being processed by task 202", primitive fifteen is being processed by task 202' and primitive sixteen is being processed by task 202.

Figure 4B:
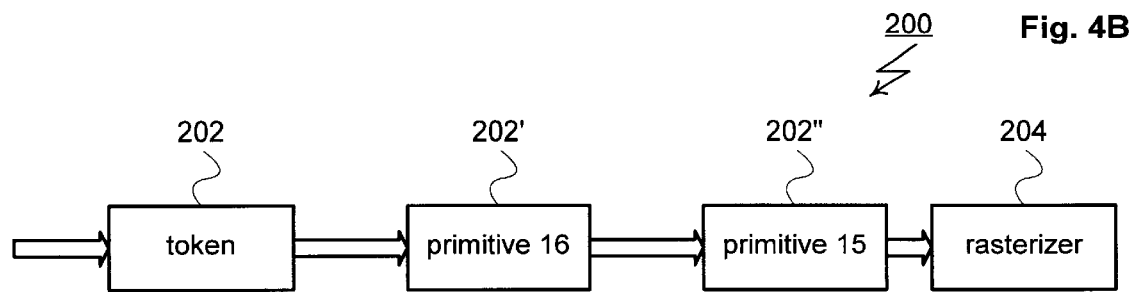
FIG. 4B is a block diagram of the graphics pipeline of FIG. 4A, now shown during as a second rendering pass is initiated.

FIG. 4B shows the same graphics pipeline 200 during the next time period. During this time period, host processors 102 have begun the process of initiating another rendering pass. Host processors 102 initiate this rendering pass by sending a token to graphics pipeline. In FIG. 4B, task 202 is shown processing this token. Primitives sixteen and fifteen are being processed by tasks 202' and 202" respectively.

Figure 4C:
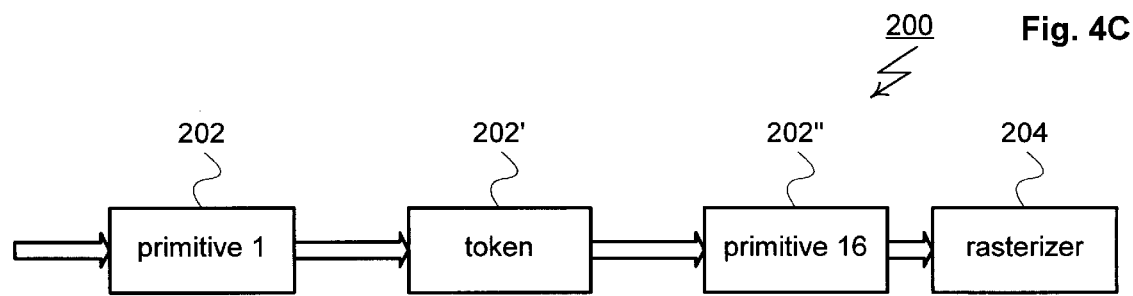
FIG. 4C is a block diagram of the graphics pipeline of FIG. 4B, now shown during as the first rendering pass is completes.

The next time period is shown in FIG. 4C. During this time period, the new rendering process has begun. Thus, primitive one is being processed by task 202. Task 202' is processing the token and task 202" is processing token sixteen.

As shown, in the sequence of FIGS. 4A through 4C, graphics pipeline 200 has overlapped processing of rendering passes. This means that graphics pipeline 200 initiate the processing of a new rendering pass while the graphics pipeline 200 is finishing the processing of a former rendering pass. This increases the performance of graphics pipeline 200 by reducing the amount of time spent switching between rendering passes.

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A pipeline for transforming graphics data, the pipeline comprising:
   a memory storage area, the memory storage area configured to store a series of state information blocks; and
   a sequential series of pipeline tasks, each task including:
      means for receiving graphics data;
      means for selecting a state information block within the memory storage area, the state information block being associated with the task; and
      means for transforming a received graphics data using the selected state information block.

2. A pipeline as recited in claim 1 wherein the received graphics data is graphics primitives.

3. A pipeline as recited in claim 1 wherein the received graphics data is pixel data.

4. A pipeline as recited in claim 1 further comprising:
   means for receiving graphics attributes; and
   means for storing the received graphics attributes in the state information blocks of the memory storage system.

5. A pipeline as recited in claim 1 wherein the graphics data is received from a host computer system.

6. A pipeline as recited in claim 1 wherein the graphics data is received from a previous pipeline task.

7. A pipeline as recited in claim 1 wherein the means for selecting a state information block further comprises:
   means for receiving a token; and
   means for decoding the received token to create an address for the state information block within the memory storage system.

8. A pipeline as recited in claim 7 wherein the token is received from a host computer system.

9. A pipeline as recited in claim 7 wherein the token is received from a previous pipeline task.

10. A pipeline for rendering graphics primitives, the pipeline comprising:
    a series of pipeline tasks including an initial pipeline task and one or more following pipeline tasks, the pipeline tasks connected in sequence so that graphics primitives input by a host computer system to the initial pipeline task are sequentially transformed by the initial pipeline task and each following pipeline task; and
    a memory storage area, the memory storage area configured to supply state information blocks to at least some of the pipeline tasks on a rendering pass by rendering pass basis, the supplied pipeline tasks using the state information blocks to control the way in which graphics primitives are transformed.

11. A pipeline as recited in claim 10 further comprising an input bus connecting the memory storage area to the host computer system, the input bus operable by the host computer system to store graphics attributes on a rendering pass by rendering pass basis within the memory storage area.

12. A pipeline as recited in claim 10 wherein the final pipeline task is connected to a frame buffer.

13. A pipeline as recited in claim 10 wherein at least one of the pipeline stages includes a decoder for recognizing tokens sent by the host computer system, the decoder using received tokens to select appropriate state information blocks in the memory storage area.

14. A pipeline as recited in claim 13 wherein the decoder generates an address for each received token, the address selecting a state information block that corresponds to a particular rendering pass and is associated with the pipeline task that includes the decoder.

15. A method for rendering graphics primitives, the method comprising the steps, performed by a host computer system, of:
    initializing one or more sequences of state information blocks within a memory storage system of a graphics pipeline, each sequence associated with a respective task within the graphics pipeline, each state information block corresponding to a particular rendering pass;
    selecting state information blocks for use by each respective pipeline task during a first rendering pass; and
    sending one or more graphics primitives to the graphics pipeline for rendering using the state information blocks selected for the first rendering pass.

16. A method as recited in claim 15 wherein the step of initializing one or more sequences of state information blocks further comprises the step, performed by a host computer system, of storing a graphics attribute in each state information block being initialized.

17. A method as recited in claim 15 wherein the step of selecting state information blocks further comprises the step, performed by a host computer system, of sending a first token to the graphics pipeline.

18. A method as recited in claim 15 further comprising the steps, performed by a host computer system, of:

selecting state information blocks for use by each respective pipeline task during an $n^{th}$ rendering pass; and sending one or more graphics primitives to the graphics pipeline for rendering using the state information blocks selected for the $n^{th}$ rendering pass.

19. A method as recited in claim 18 wherein the step of selecting state information blocks further comprises the step, performed by a host computer system, of sending an $n^{th}$ token to the graphics pipeline.

\* \* \* \* \*